Patented Mar. 4, 1924.

1,485,944

UNITED STATES PATENT OFFICE.

OSKAR ANZBÖCK, OF VIENNA, AUSTRIA, AND FLORIAN HOOGENDOORN, OF DUSSELDORF, GERMANY.

LUBRICATING AND TIGHTENING COMPOSITION FROM PEAT.

No Drawing.  Application filed March 21, 1923. Serial No. 626,714.

*To all whom it may concern:*

Be it known that we, OSKAR ANZBÖCK, a citizen of the Republic of Austria, and residing at Vienna, Austria, and FLORIAN HOOGENDOORN, a citizen of Germany, and a resident of 15 Immermann-Strasse, in the city of Dusseldorf, Germany, have invented jointly a certain new and useful Improvement in Lubricating and Tightening Composition from Peat, of which the following is a specification.

This invention has reference to lubricating and tightening and packing and stuffing material, suitable among other uses for bearings, journals and the like, and it refers particularly to compositions of the kind referred to prepared by the use of peat, and suitable for use in connection with journal bearings for engines, vehicles and the like. In this and various other kinds of machinery there is an important demand for permanent lubrication combined with great economy of lubricating agent, and at the same time to provide a tightening and protection against the entrance of any dust and of other foreign bodies. Our invention providing a lubricating composition of the kind referred to is particularly well adapted for utilization for the bearings of vehicles and conveyances of all kinds.

The invention is chiefly based upon the employment of peat fibers, the very high absorbing capacity of which provides for the storage of a large supply of lubricant. In order to produce a lubricating and packing composition peat fiber is mixed with an elastic or resilient substance consisting of vegetable or animal fibers and this mixture of absorbing and elastic fibers is saturated with lubricating oil. This material is formed into cords, ropes, braids, cushions, pillows or the like, and in such condition it is inserted into the cavities of bearings so as to come in contact with the movable surface, bearing, pivots, journals, to be lubricated, and yields the lubricant to such surfaces.

According to another method for carrying out the invention, by way of example, substantially pure peat fiber is mixed with grease of paste like consistency, so as to produce a pasty or ointment-like mass, in which the peat is the carrier for the solid or semi-solid fat or grease. This pasty composition is particularly employed for packing purposes, but it may also be inserted into the cavities of bearings for lubricating purposes.

The following examples will serve for a better illustration of our invention:—

1. *Example for a lubricating composition.*—From peat, preferably as rich in fiber as possible, the peat fiber, sometimes also called peat-hair, is obtained in the usual well known manner. It is, of course, advantageous to employ fibers of as great a length as possible, and of as pure a condition as possible. These peat fibers are mixed manually or by means of suitable machinery with fibers of elastic condition, and of vegetable or animal origin. As suitable kinds of material we may mention, by way of example, cotton, other kinds of vegetable fibers, pulp fiber, horse hair or other animal hair. The mixing proportions may be different in accordance with its being desired to obtain a product of more decided absorbing or elastic properties. The mixture of absorbing and elastic fibers is shaped, so as to assume the form of a strand, tuft, braid or rope, and thereby to insure a certain coherence of the material, the strand or the like thus obtained being thoroughly impregnated with lubricant. The said lubricant may be added, either cold, or, if rather viscid, thickly fluid or pasty, after having been previously heated, in order to produce as high a saturation as possible, particularly of the absorbing peat fiber. Such peat fiber absorbs or takes up of course a large amount of lubricating agent. The finished strand-like product is then introduced into a cavity of the bearing or the like in the manner of a packing, so as to cause it to be in contact with the surfaces to be lubricated. The arrangement may, of course, be very different, and is governed by the construction of the bearing under consideration. One may for instance make use of springs adapted to constantly force the lubricating material against the surfaces to be lubricated.

The lubricating material described may also be formed so as to constitute a cushion by moulding the fibers so as to form a cushion after impregnating them with the lubricant, or by folding the strand above described in several coil shaped windings contiguous to or above each other, so as to thereby obtain a cushion shaped or pillow shaped article which is made coherent by sewing or stitching together. For producing the cohesion of the parts, and for insuring the cushion shape a net or the like enclosing the entire structure may be employed through the meshes of which the lubricant is adapted to be discharged to the outside. A cushion as described may also be introduced at a suitable point of the bearing or at a plurality of places, so as to constantly bear against the surface to be lubricated. Springs may also be used in this connection for insuring permanent contact.

A lubricating agent as hereinbefore described in view of the employment of the peat fiber contains a very large amount of a supply of lubricant, and it therefore provides for a continuous transfer of lubricant, and at the same time provides for a great economy of the greasing or oiling material. In order to keep up the proper composition of the supply of lubricant absorbed by the packing or carrying material, lubricating oil may be supplied from time to time or may be continuously fed, which may be effected for instance by immersing the packing in a source of oil supply.

2. *Example for the preparation of a lubricating paste.*—The dry peat paste prepared in as pure a condition as possible is intimately mixed with a suitable lubricant, preferably a solid or semi-solid fat or grease, so as to obtain a perfect saturation of the peat fiber with the lubricating agent, the latter being preferably present in excess, thereby producing a pasty or doughlike mass.

Small additions of other kinds of fibrous material, such as for instance elastic fibers of animal or vegetable origin are not excluded, though the employment of the peat fiber is the most important feature. Additions of perfectly dry lubricants, such as graphite for instance, may also be made. Such a compound, similar to a lubricating paste is adapted to be easily introduced into any desired cavity. Thus for instance such masses may be introduced in the vicinity of bearing surfaces between two disc-like partitions by which means a reliable packing and at the same time lubricating action is obtained. It is of particular importance that the tightening action is thereby accomplished in a most perfect manner so as to reliably secure bearing surfaces against the entrance of dust and of other foreign bodies.

In machine building a number of bearings are met with which by the means heretofore known could not be satisfactorily packed or tightened, thus for instance the journals and bearings of mills, disintegrating machinery, sand treating, sand washing and sand mixing machines. Bearings of this kind were exposed to premature destruction heretofore in spite of great precautionary measures. By means of the composition according to this invention it becomes possible, however, to carry on the packing and tightening in a most perfect manner together with the lubricating action, there being the important additional advantage that the new article may be employed even under the most difficult structural conditions, particularly where but little space is available, inasmuch as the article is not restricted to a particular shape. Even difficultly accessible cavities can easily be filled up therewith. The employment of pure peat fiber for the lubricating and packing agent is of particular importance in such cases where the absorption or impregnation or the accumulation of especially large amounts of lubricating material by means of the peat fiber cushion is desired, inasmuch as pure peat fiber cushions are greatly superior to other cushions of mixed material, even those which contain a large percentage of peat fibers.

We are aware that it is not new to employ fibrous material, such as cotton, hemp, jute, paper and other fibrous material, including asbestos, of comparatively great elasticity as a carrier for oils and greases; but all these fibers refuse to absorb highly viscid liquids, as their capillarity and the sectional area of their tubular elements has been extremely reduced by the chemical and mechanical treatment in the course of manufacture or, as in the case of asbestos, does not exist at all, so that all such material is absolutely uncapable of saturating itself and permanently retaining a great excess of greases and lubricants, which substances are merely superficially and mechanically mixed therewith, without permanently lodging themselves in the pores of the material. With peat fibers, however, which have not undergone any treatment for imparting to them great flexibility and durability, but which are retained in their pure native dried and rather brittle condition the original tubular state is preserved to such a degree that the material will readily suck up and absorb even so highly viscid substances as greases and lubricating oils of great body, and become absorbed therewith, the greases and oils being taken up and retained so eagerly by the material that, as experiments have shown, it will swell and become inflated and greatly increase its volume in the absorption process.

The invention has been described in its broad aspects, and it is obvious that it is susceptible of various modifications to suit existing conditions of application, and without deviating from the spirit of our invention and from the scope of the claims.

We claim:—

1. As a new composition of matter, a lubricating and packing material, and consisting of a mixture of substantially pure peat fiber with a lubricant.

2. As a new composition of matter, a lubricating and packing material, and consisting of a paste like mixture of substantially pure peat fibers with fatty material of great body.

3. As a new composition of matter, a lubricating and packing material, and consisting of substantially pure peat fibers, impregnated to saturation with an excess of a lubricant.

4. As a new composition of matter, a lubricating and packing material, which consists of a mixture of substantially pure peat fibers with elastic vegetable and animal fibers and with a lubricant.

5. As a new composition of matter, a lubricating and packing material comprising a mixture of long haired peat fibers with a lubricant.

6. As a new composition of matter, a lubricating and packing material comprising a mixture of long haired pure peat fibers with elastic fibers of other organic origin, and an excess of lubricant.

7. A new lubricator, comprising a pad of a mixture of long haired, substantially pure peat fibers with an excess of lubricant.

8. A new lubricator, comprising a cushion-like pad of a mixture of substantially pure peat fibers with a lubricant.

9. A new lubricator, comprising a cushion-like pad of a mixture of substantially pure peat fibers with a lubricant and with elastic vegetable and animal fibers.

10. A new lubricator comprising a braided pad, consisting of a mixture of substantially pure peat fibers with a lubricant.

11. As a new lubricator a braided pad, consisting of a mixture of peat fibers and elastic vegetable and animal fibers with a lubricant.

In testimony whereof we have signed our names to this specification.

OSKAR ANZBÖCK.
FLORIAN HOOGENDOORN.

Witnesses:
CARL CONDLOSSBERG,
ALBIN SCHILLER.